(12) United States Patent
Liu et al.

(10) Patent No.: US 7,890,502 B2
(45) Date of Patent: Feb. 15, 2011

(54) HIERARCHY-BASED PROPAGATION OF CONTRIBUTION OF DOCUMENTS

(75) Inventors: Tie-Yan Liu, Beijing (CN); Wei-Ying Ma, Beijing (CN); Tao Qin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 53 days.

(21) Appl. No.: 11/273,715

(22) Filed: Nov. 14, 2005

(65) Prior Publication Data

US 2007/0112815 A1 May 17, 2007

(51) Int. Cl.
G06F 7/00 (2006.01)
G06F 17/30 (2006.01)
(52) U.S. Cl. ...................... 707/726; 707/956
(58) Field of Classification Search ................ 707/101, 707/3, 4, 10
See application file for complete search history.

(56) References Cited

U.S. PATENT DOCUMENTS

| | | | | |
|---|---|---|---|---|
| 4,999,790 A * | 3/1991 | Murayama et al. | ............. | 707/3 |
| 5,875,446 A * | 2/1999 | Brown et al. | ................. | 707/3 |
| 5,895,470 A | 4/1999 | Pirolli et al. | | |
| 6,366,910 B1 | 4/2002 | Rajaraman et al. | | |
| 6,792,475 B1 | 9/2004 | Arcuri et al. | | |
| 6,826,576 B2 | 11/2004 | Lulich et al. | | |
| 7,031,961 B2 * | 4/2006 | Pitkow et al. | .................. | 707/4 |
| 7,043,468 B2 | 5/2006 | Forman et al. | | |
| 7,089,237 B2 * | 8/2006 | Turnbull et al. | ................ | 707/5 |
| 7,139,745 B2 * | 11/2006 | Nakamura et al. | ............. | 707/2 |
| 7,188,117 B2 * | 3/2007 | Farahat et al. | ............... | 707/101 |
| 7,231,395 B2 * | 6/2007 | Fain et al. | ................... | 707/101 |
| 7,457,801 B2 | 11/2008 | Liu et al. | | |
| 2006/0031673 A1 | 2/2006 | Beck et al. | | |
| 2007/0022287 A1 | 1/2007 | Beck et al. | | |
| 2007/0112753 A1 | 5/2007 | Liu et al. | | |
| 2009/0043764 A1 | 2/2009 | Liu et al. | | |

OTHER PUBLICATIONS

Voorhees, Overview of TREC 2004. Nov. 16-19, 2004, p. 1.*
Song et al., Microsoft Research Asia at Web Track and Terabyte Track of Trec 2004, Nov. 16-19, 2004, 12 pages.*
Ding et al., A Generalized Site Ranking Model for Web IR, IEEE/WIC International Conference on Web Intelligence (WI'03), Oct. 13-17, 2003, 4 pages.*
Kesson, 2002, http://www.fundza.com/vectors/normalize/index.html (Accessed: Feb. 18, 2009).*
Euclidean Vector, http://en.wikipedia.org/wiki/Euclidean_vector (Accessed: Feb. 18, 2009).*
Simmons, Jul. 29, 2008, http://www.mathwords.com/n/normalizing_a_vector.htm (Accessed: Feb. 18, 2009).*
Weisstein, 1999-2009, http://mathworld.wolfram.com/NormalizedVector.html (Accessed: Feb. 18, 2009).*
Adobe, http://livedocs.adobe.com/director/mx2004/release_update_en/wwhelp/wwhimpl/common/html/wwhelp.htm?context=Director_MX_2004_Documentation&file=07_me267.htm (Accessed Feb. 18, 2009).*
FOLDOC: Cache, 1997, http://foldoc.org/index.cgi?query=cache&action=Search (Accessed: Feb. 18, 2009).*
Ponte et al, A Language Modeling Approach to Information Retrieval, ACM, SIGIR 98, pp. 275-281.*

(Continued)

*Primary Examiner*—Pierre M Vital
*Assistant Examiner*—Jason Liao
(74) *Attorney, Agent, or Firm*—Perkins Coie LLP (57) ABSTRACT

A method and system for determining the contribution of a document within a hierarchy of documents based on the contribution of descendant documents is provided. The contribution system provides a hierarchy of documents that specifies the ancestor/descendant relations between documents. For each document of a hierarchy, the contribution system determines the contribution of each document factoring in the contribution of descendant documents. The contribution may be the relevance of a document to a topic, a feature of a document, and so on.

10 Claims, 5 Drawing Sheets

OTHER PUBLICATIONS

Ding, C., et al., "A Generalized Site Ranking Model for Web IR," Web Intelligence, 2003, WI 2003, Proceedings, IEEE/WIC International Conference on Oct. 13-17, 2003 (4 pages).

International Search Report for International Application No. PCT/US006/044280, Microsoft Corporation, Apr. 23, 2007 (3 pages).

Amento, Brian, Loren Terveen and Will Hill, "Does 'Authority' Mean Quality? Predicting Expert Quality Ratings of Web Documents," ACM SIGIR 2000, Jul. 2000, Athens, Greece, pp. 296-303.

Amitay, Einat, David Carmel, Adam Darlow, Ronny Lempel and Aya Soffer, "Topic Distillation with Knowledge Agents," 11th TREC, 2002, 10 pages.

Bharat, Krishna and Monika R. Henzinger, "Improved Algorithms for Topic Distillation in a Hyperlinked Environment," SIGIR'98, Melbourne, Australia, ACM 1998, 9 pages.

Bharat, Krishna and George A. Mihaila, "When Experts Agree: Using Non-Affiliated Experts to Rank Popular Topics," WWW10, Hong Kong, May 2000, Amsterdam pp. 597-602.

Brin, Sergey and Lawrence Page, "The Anatomy of a Large-Scale Hypertextual Web Search Engine," 7th WWW, 1998, 20 pages.

Broder, Andrei, "A Taxonomy of Web Search," SIGIR Forum 36(2), 2002, 8 pages.

Chakrabarti, Soumen, Mukul Joshi and Vivek Tawde, "Enhanced Topic Distillation Using Text, Markup Tags, and Hyperlinks," SIGIR'01, New Orleans, Louisiana, ACM 2001, 9 pages.

Chakrabarti, Soumen, "Integrating the Document Object Model with Hyperlinks for Enhanced Topic Distillation and Information Extraction," WWW10, May 2001, Hong Kong, pp. 211-220.

Chakrabarti, Soumen, Byron Dom, Prabhakar Raghavan and Sridhar Rajagopalan, "Automatic Resource Compilation by Analyzing Hyperlink Structure and Associated Text," WWW7, Elsevier Science Publishers B.V., 1998, 13 pages.

Craswell, Nick and David Hawking, "Overview of the TREC-2004 Web Track," 13th TREC, 2004, pp. 1-9.

Craswell, Nick and David Hawking, "Overview of the TREC 2003 Web Track," 12th TREC 2003, Mar. 22, 2004, pp. 1-15.

Cremer, F., W. de Jong, K. Schutte, A.G. Yarovoy, V. Kovalenko and R.F. Bloemenkamp, "Feature Level Fusion of Polarimetric Infrared and GPR Data for Landmine Detection," In H. Sahli, AM Bottoms and J. Cornelis, EUDEM2-SCOT 2003 International Conference on Requirements and Technologies for the Detection, Removal and Neutralization of Landmines and UXO, vol. 2, Brussel, Vrije Universiteit Brussel, 5 pages.

Dima, Cristian S., Nicolas Vandapel and Martial Hebert, "Classifier Fusion for Outdoor Obstacle Detection," International Conference on Robotics and Automation, IEEE, Apr. 2004, 6 pages.

Feng, Guang, Tie-Yan Liu, Xu-Dong Zhang, Tao Qin, Bin Gao and Wei-Ying Ma, "Level-Based Link Analysis," In the 7th APWEB, 2005, 12 pages.

Haveliwala, Taher H., "Topic-Sensitive PageRank: A Context-Sensitive Ranking Algorithm for Web Search," 11th WWW, 2002, pp. 1-22.

Hawking, David, "Overview of the TREC-9 Web Track," 9th TREC, 2000, Sep. 4, 2001, pp. 1-16.

Ingongngam, P. and A. Rungsawang, "Report on the TREC 2003 Experiments using Web Topic-Centric Link Analysis," 12th TREC 2003, 5 pages.

Kamvar, Sepandar D., Taher H. Haveliwala, Christopher D. Manning and Gene H. Golub, "Exploiting the Block Structure of the Web for Computing PageRank," 13th WWW, 2003, 13 pages.

Kleinberg, Jon M., "Authoritative Sources in a Hyperlinked Environment," Journal of the ACM, vol. 46, No. 5, 1999, 34 pages.

McBryan, Oliver A., "GENVL and WWWW: Tools for Taming the Web," In Proceedings of the 1st WWW, 1994, 12 pages.

Page, L., S. Brin, R. Motwani and T. Winograd, "The PageRank Citation Ranking: Bringing Order to the Web," Jan. 29, 1998, Stanford University Technical Report (17 pages).

Robertson, S.E. and K. Sparck Jones, "Relevance Weighting of Search Terms," Journal of the American Society for Information Science, vol. 27, No. 3, May-Jun. 1976, pp. 129-146.

Shakery, Azadeh and ChengXiang Zhai, "Relevance Propagation for Topic Distillation UIUC TREC-2003 Web Track Experiments," 12th TREC, 2003, pp. 1-5.

Song, Ruihua, Ji-Rong Wen, Shuming Shi, Guomao Xin, Tie-Yan Liu, Tao Qin, Xin Zheng, Jiyu Zhang, Guirong Xue and Wei-Ying Ma, "Microsoft Research Asia at Web Track and Terabyte Track of TREC 2004," 13th TREC 2004, pp. 1-12.

"AppInit_DLLs Registry Value and Windows 95," Microsoft Corporation, Article ID 134655, last review Mar. 1, 2005, revision 3.2, 2 pages, http://support.microsoft.com/kb/134655/.

"How to Use the Windiff.exe Utility," Microsoft Knowlege Base Article—159214, Copyright 2004, Microsoft Corporation (3 pages) http://support.microsoft.com/default.aspx?scid=kb;en-us;159214.

"Working with the AppInit_DLLs registry value," Microsoft Corporation, Article ID 197571, last review Feb. 19, 2005, revision 4.0, 1 page, http://support.microsoft.com/default.aspx?scid=kb;en-us;197571.

Altunergil, Oktay, "Scanning for Rootkits," Linux Devcenter.com, Feb. 7, 2002 (8 pages).

Altunergil, Oktay, "Understanding Rootkits," Linus Devcenter.com, Dec. 14, 2001 (3 pages).

Baker, L. Douglas and Andrew Kachites McCallum, "Distributional Clustering of Words for Text Classification," SIGIR '98, Australia, ACM 1998, pp. 96-103.

holy_father@phreaker.net, "Invisibility on NT boxes—How to become unseen on Windows NT," Code Breakers Journal, vol. 1, No. 2 (2004), May 8, 2003, 26 pages.

Huang, Chien-Chung, Shui-Lung Chuang and Lee-Feng Chien, "LiveClassifier: Creating Hierarchical Text Classifiers through Web Corpora," WWW 2004, New York, ACM 2004, pp. 184-192.

Iwayama, Makoto, Atsushi Fujii, Noriko Kando and Yuzo Marukawa, "An Empirical Study on Retrieval Models for Different Document Genres: Patents and Newspaper Articles," SIGIR '03, Toronto, Canada, ACM 2003, pp. 251-258.

Lam, Wai and Chao Yang Ho, "Using A Generalized Instance Set for Automatic Text Categorization," SIGIR '98, Melbourne, Australia, ACM 1998, pp. 81-89.

Larkey, Leah S. and W. Bruce Croft, "Combining Classifiers in Text Categorization," SIGIR'96, Zurich, Switzerland, ACM 1996, pp. 289-297.

Lewis, David D., "An Evaluation of Phrasal and Clustered Representations on a Text Categorization Task," 15th Annual SIGIR'92, Denmark, ACM 1992, pp. 37-50.

Liu, Tie-Yan, Hao Wan, Tao Qin, Zheng Chen, Young Ren and Wei-Ying Ma, "Site Abstraction for Rare Category Classification in Large-Scale Web Directory," WWW 2005, Japan, ACM 2005, pp. 1108-1109.

Makoto, Iwayama and Tokunaga Takenobu, "Cluster-Based Text Categorization: A Comparison of Category Search Strategies," ISSN 0918-2802, Technical Report 95-TR0016, Aug. 1995, 15 pages.

Masand, Brij, Gordon Linoff and David Waltz, "Classifying News Stories using Memory Based Reasoning," 15th Annual International SIGIR'92, Denmark, ACM 1992, pp. 59-65.

NTQuerySystemInformation, Microsoft, Jul. 2005, 4 pages, http://msdn.microsoft.com/library/en-us/sysinfo/base/ntquerysysteminformation.asp?frame=true.

Schneier, Bruce, "Schneier on Security:—A weblog covering security and security technology: GhostBuster," Feb. 15, 2005, 9 pages, http://www.schneier.com/blog/archives/2005/02/ghostbuster.html.

Tseng, Yuen-Hsien and Da-Wei Juang, "Document-Self Expansion for Text Categorization," SIGIR '03, Toronto, Canada, ACM 2003, pp. 399-400.

Wibowo, Wahyu and Hugh E. Williams, "Strategies for Minimising Errors in Hierarchical Web Categorisation," CIKM'02, Virginia, 2002 ACM, pp. 525-531.

Yang, Yiming, "A Study on Thresholding Strategies for Text Categorization," SIGIR'01, New Orleans, Louisiana, ACM 2001, 9 pages.

Yang, Yiming, Jian Zhang and Bryan Kisiel, "A Scalability Analysis of Classifiers in Text Categorization," SIGIR'03, Toronto, Canada, ACM 2003, pp. 96-103.

* cited by examiner

HIERARCHY-BASED PROPAGATION OF CONTRIBUTION OF DOCUMENTS

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on various metrics such as the term frequency and inverse document frequency metric ("tf*idf"). The search engine service may also generate an importance score to indicate the importance of the web page based on various metrics such as Google's PageRank metric. The search engine service then displays to the user links to those web pages in an order that is based on a ranking determined by their relevance and importance.

Two well-known techniques for determining the importance of web pages are PageRank and HITS ("Hyperlink-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q) \quad \text{and} \quad h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

The use of hyperlinks for deriving the importance of web pages and then factoring in the importance into the ranking of web pages has shown only limited success. Moreover, it has been found that the combination of relevance scores and importance scores may not significantly improve the precision of query results.

SUMMARY

A method and system for determining the contribution of a document within a hierarchy of documents based on the contribution of descendant documents is provided. The contribution system provides a hierarchy of documents that specifies the parent/child relations between documents. Parent/child relations are also referred to as the ancestor/descendant relations. For each document of a hierarchy, the contribution system determines the contribution of each document factoring in the contribution of descendant documents. The contribution system may propagate the contribution of a document to each of its ancestor documents or to only a certain number of the closest ancestor documents (e.g., only to its parent document). The contribution may be the relevance of a document to a topic, a feature of a document, and so on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for determining the contribution of a document within a hierarchy of documents based on the contribution of descendant documents is provided. In one embodiment, the contribution system provides a hierarchy of documents that specifies the parent/child relations between documents. Parent/child relations are also referred to as the ancestor/descendant relations. An example of a hierarchy of documents is the hierarchy of web pages (i.e., documents) of a web site. The hierarchy may be defined by the uniform resource locators ("URL") of the web pages. For example, the web page with the URL "www.va.gov" may be the common ancestor of all the web pages of the web site, which is also referred to as the root web page of the web site. Child web pages of the root web page may include "www.va.gov/disclaim.htm" and "www.va.gov/resdev." For each document of a hierarchy, the contribution system determines the contribution of each document factoring in the contribution of descendant documents. For example, the contribution may be the relevance of a web page to a topic or may be the feature of a web page such as frequency of a term. The contribution system effectively propagates the contributions of descendant documents to ancestor documents so that the contribution of documents can more accurately represent the contribution represented by the document and its descendant documents. The contribution system may propagate the contribution of a document to each of its ancestor documents or to only a certain number of the closest ancestor documents (e.g., only to its parent document). In this way, the contribution system can generate a more accurate assessment of the contribution of a document by factoring in the contribution of descendant documents.

In one embodiment, the contribution system calculates the relevance of web pages of a web site to a topic. The topic may be derived from various sources including a list of categories for categorizing web pages, a user-submitted query, and so on. The contribution system uses a hierarchy of web pages of the web site to propagate the relevance of web pages to a topic from descendant web pages to ancestor web pages. The contribution system may use a conventional metric such as term frequency and inverse document frequency to determine the relevance of a web page to a topic. For example, the topic may be "veteran medical benefits" and the relevance of a web page may be based on the number of occurrences of the term "veteran" within the web page and the number of web pages of the web site that contain the term "veteran." The contribution system may initially calculate the relevance to the topic for the web pages that do not have descendant web pages (i.e., leaf web pages). The contribution system may determine the relevance factoring in the content of the web page, metadata of the web page, title of the web page, keywords of the web page, and so on. The contribution system then propagates the relevance of the web pages to their ancestor web pages. The contribution system may calculate the relevance of each ancestor web page itself and then factor in the relevance of its descendant web pages to provide an overall relevance for the ancestor web page. The contribution system may calculate relevance according to the following equation:

$$f(S(p), Child(p)) = \begin{cases} S(p), & Child(p) = \Phi \\ (1+\alpha)S(p) + \alpha \dfrac{\sum_{q \in RelChild(p)} f(S(q), Child(q))}{|RelChild(p)|}, & RelChild(p) \neq \Phi \\ (1+\alpha)S(p), & Child(p) \neq \Phi \text{ and } RelChild(p) = \Phi \end{cases} \quad (1)$$

where f(S(p), Child(p)) represents the relevance of web page p, S(p) represents the relevance of web page p itself, Child(p) represents the child web pages of p, $\Phi$ represents the empty set, RelChild(p) represents the child web pages of p that are relevant to the topic | | represents the number of web pages in a set and $\alpha$ represents the weight between the relevance of the web page itself and the relevance of the child web pages. According to this equation, the relevance of a web page is based in part on the relevance of each descendant web page. Alternatively, the term f(S(q), Child(q)) could be replaced with the term S(q) so that the relevance of a web page would only be based on the relevance of its child web pages rather than more distant descendant web pages. Also, according to this equation, the relevance of a web page is based only on the relevance of descendant web pages that are related to the topic. Alternatively, the relevance may be based on the relevance of all descendant web pages with a web page that is not related to the topic having a very low relevance. The factor of $(1+\alpha)$ increases the relevance of a web page even when the web page has no child web pages that are relevant to the topic, which effectively increases the relevance of web pages that have child web pages.

In one embodiment, the contribution system calculates a feature of web pages of a web site. The contribution system uses a hierarchy of web pages of the web site to propagate the feature of web pages from descendant web pages to ancestor web pages. The contribution system may use a conventional metric for generating the feature of a web page. The feature of a web page may include term frequency, keyword frequency, title, image size, and so on. More generally, a feature may be represented as a feature vector describing various characteristics of a web page. The contribution system may initially generate the feature for the web pages without descendant web pages. The contribution system then propagates the feature of these web pages to their parent web pages and to their parent web pages up the hierarchy of web pages. The contribution system may generate the feature of each ancestor web page from the web page itself and then factor in the feature of its descendant web pages to provide an overall feature for the ancestor web page. The contribution system may generate the feature of a web page according to the following equation:

$$g(F(p), Child(p)) = \qquad (2)$$

$$\begin{cases} F(p), & Child(p) = \Phi \\ (1+\alpha)F(p) + \alpha \dfrac{\sum_{q \in RelChild(p)} g(F(p), Child(p))}{|RelChild(p)|}, & RelChild(p) \neq \Phi \\ (1+\alpha)F(p), & Child(p) \neq \Phi \\ & \text{and } RelChild(p) = \Phi \end{cases}$$

where g(F(p), Child(p)) represents the feature of web page p, F(p) represents a function for generating the feature for web page p, Child(p) represents the child web pages of p, $\Phi$ represents the empty set, RelChild(p) represents the child web pages of p that are related to the feature, | | represents the number of web pages in a set and $\alpha$ represents the weight between the feature derived from the web page itself and the feature of the descendant web pages. As described above for Equation 1, Equation 2 may be limited to propagate the feature to only a certain number of closest ancestors.

In one embodiment, the contribution system handles the feature for the length of a document as a special case because the length of a document is important to many different relevance metrics. The contribution system may generate a feature representing the length of a web page according to the following equation:

$$L'(p) = \begin{cases} L(p) & Child(p) = \Phi \\ (1+\alpha) * L(p) & Child(p) \neq \Phi \end{cases} \qquad (3)$$

where L'(p) represents the feature representing the length of web page p, L(p) represents the length of web page p, Child (p) represents the child web pages of p, $\Phi$ represents the empty set, and $\alpha$ represents a factor for increasing the length feature of web page p. The contribution system increases the feature representing the length of a web page whenever the web page has at least one child web page. Alternatively, the contribution system may factor into the feature for length the actual length of descendant web pages.

Figure 1:
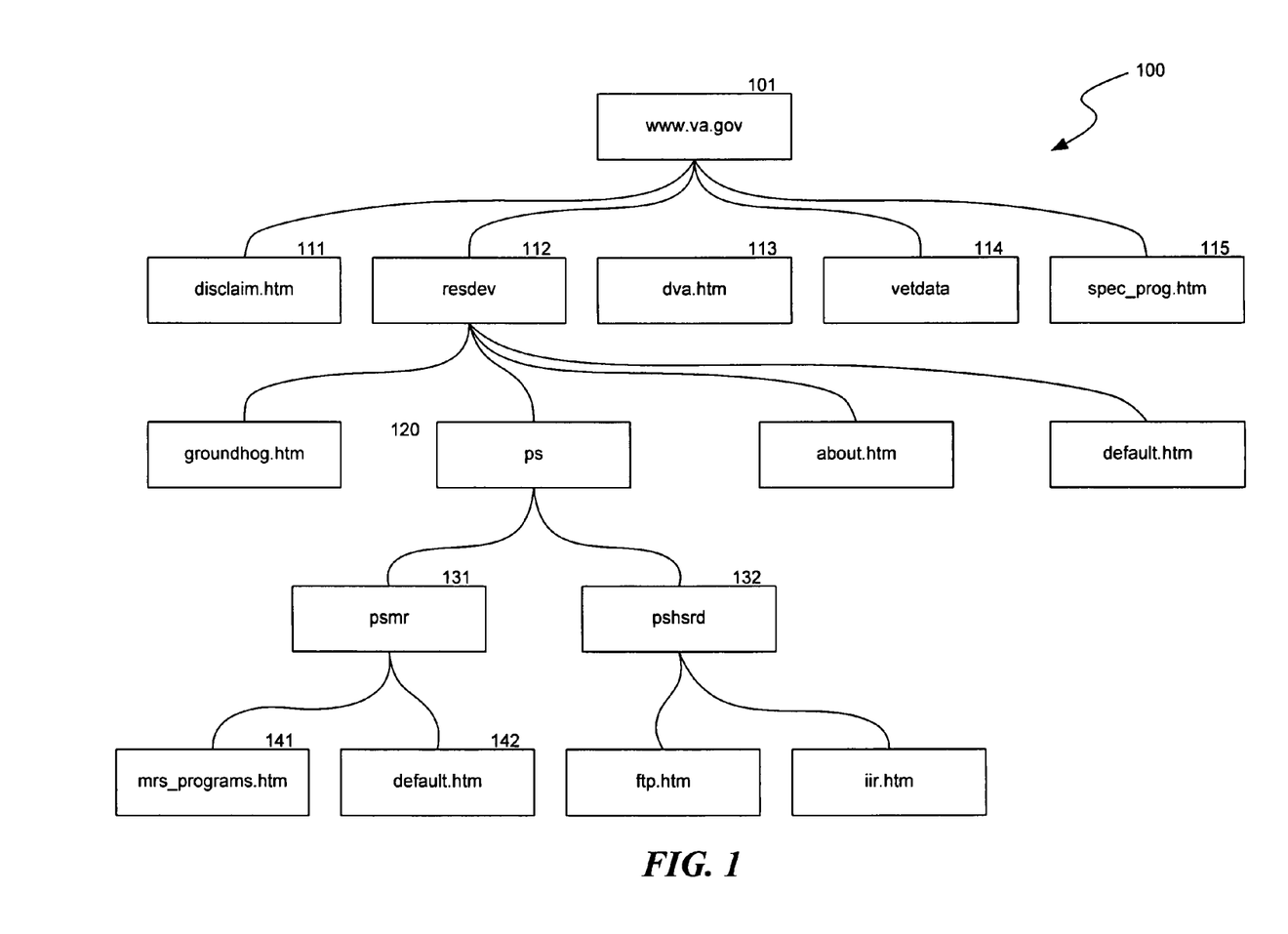
FIG. 1 is a diagram that illustrates the hierarchical relation of web pages of a sample web site.

FIG. 1 is a diagram that illustrates the hierarchical relation of web pages of a sample web site. The web site has a root web page 101 identified by the URL "www.va.gov." Web page 101 has child web pages 111-115, with URLs "www.va.gov/disclaim.htm," "www.va.gov/resdev," "www.va.gov/dva.htm," "www.va.gov/vetdata," and "www.va.gov/spec_prog.htm." In this example, the depth of the URL indicates the hierarchical relations of the web pages. For example, web page 120 is a child of web page 112 and has the URL "www.va.gov/resdev/ps." Web page 120 has child web pages 131 and 132 with URLs "www.va.gov/resdev/ps/psmr" and "www.va.gov/resdev/ps/pshrd." Web page 131 has child web pages 141 and 142 with URLs "www.va.gov/resdev/ps/psmr/mrs_programs. htm" and "www.va.gov/resdev/ps/psmr/default.htm." In this example, web page 101 is an ancestor web page common to all the other web pages, and web page 141 is a descendant web page of web pages 131, 120, 112, and 101. One skilled in the art will appreciate that various techniques may be used to identify the hierarchical relations or structure of documents and in particular web sites. For example, the hierarchical structure of a web site may be derived from a site map included as a web page of the web site or may be derived from the intra-site links between web pages.

Figure 2:
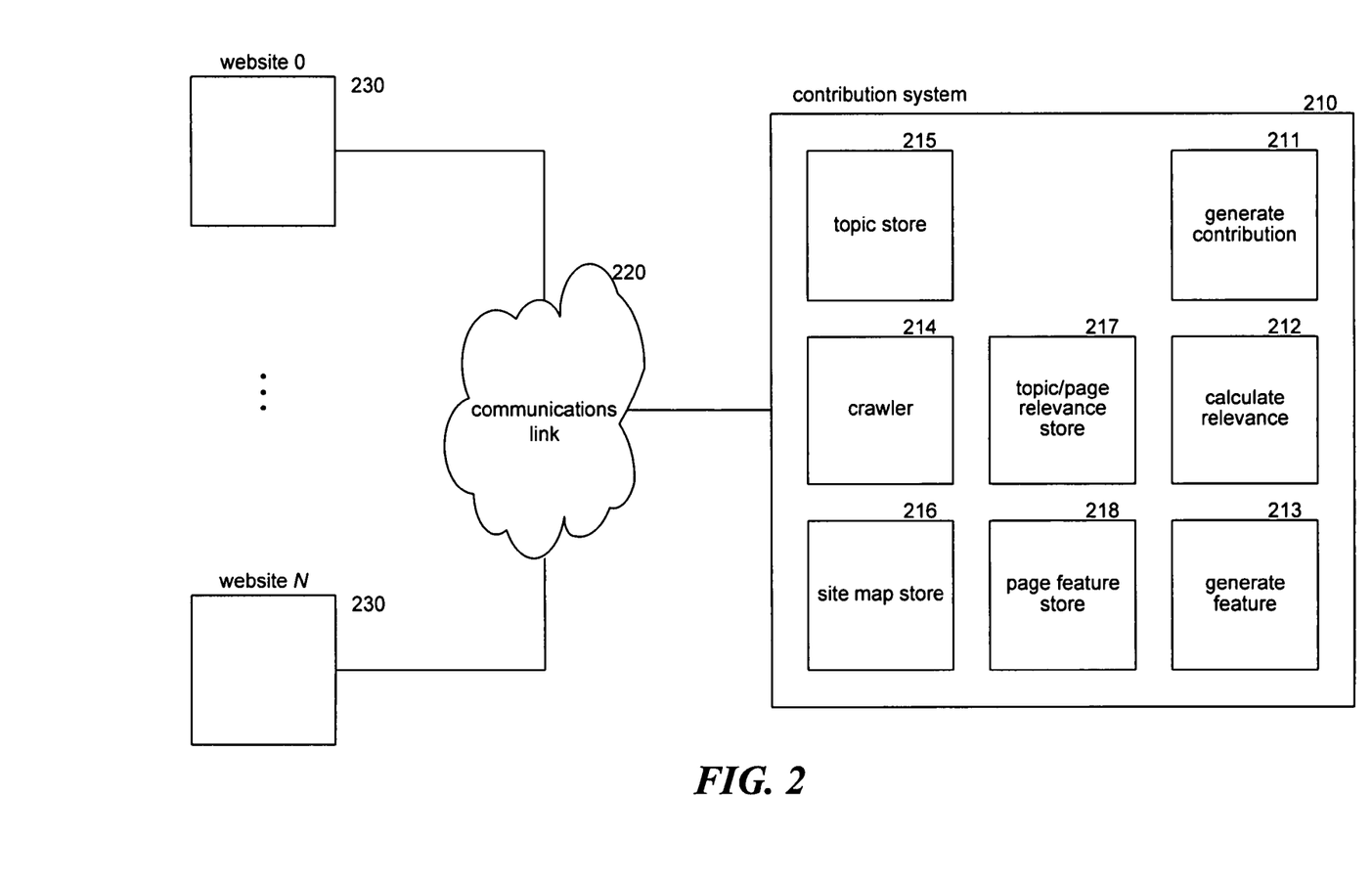
FIG. 2 is a block diagram that illustrates components of the contribution system in one embodiment.

FIG. 2 is a block diagram that illustrates components of the contribution system in one embodiment. The contribution system 210 may be connected to various web sites 230 via communications link 220. The contribution system may include a generate contribution component 211, a calculate relevance component 212, and a generate feature component 213. The contribution system may also include a crawler 214, a topic store 215, a site map store 216, a topic/page relevance store 217, and a page feature store 218. The crawler crawls the various web sites to populate the site map store with a hierarchy of web pages of each web site. The topic store contains a list of topics for which the relevance of the web pages of the web sites is to be determined. The topic/page relevance store contains an entry for each topic and within each entry a sub-entry for each web page that indicates the relevance of that web page to the topic. The page feature store contains an entry for each feature and within each entry a sub-entry for each web page that indicates the corresponding feature for the web pages. The generate contribution component invokes the calculate relevance component and the generate feature component to calculate the relevance and generate the feature for the web pages and store the results in the topic/page relevance store and the page feature store.

The computing device on which the contribution system is implemented may include a central processing unit, memory, input devices (e.g., keyboard and pointing devices), output devices (e.g., display devices), and storage devices (e.g., disk drives). The memory and storage devices are computer-readable media that may contain instructions that implement the contribution system. In addition, the data structures and message structures may be stored or transmitted via a data transmission medium, such as a signal on a communications link. Various communications links may be used, such as the Internet, a local area network, a wide area network, or a point-to-point dial-up connection.

The contribution system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The contribution system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
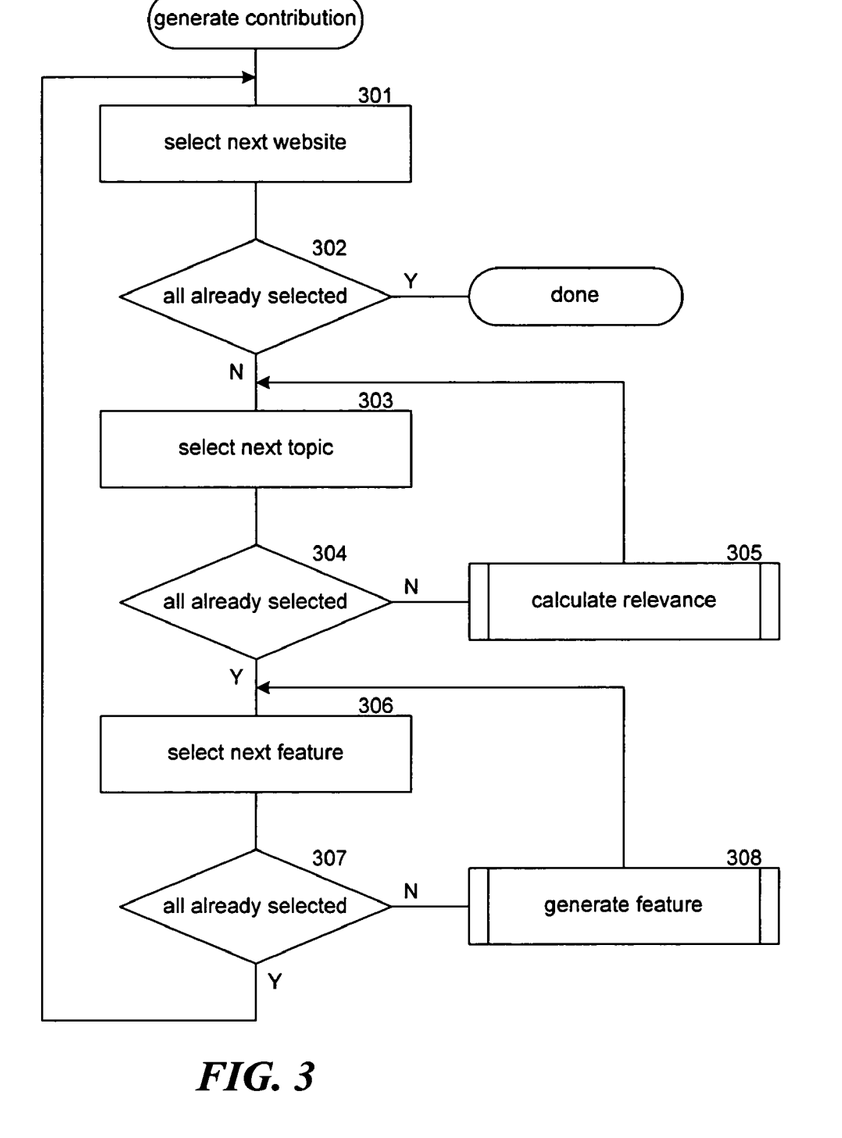
FIG. 3 is a flow diagram that illustrates the processing of the generate contribution component of the contribution system in one embodiment.

FIG. 3 is a flow diagram that illustrates the processing of the generate contribution component of the contribution system in one embodiment. The contribution system determines the contributions for relevance and features for the various web sites of the site map store. In block 301, the component selects the next web site. In decision block 302, if all the web sites have already been selected, then the component completes, else the component continues at block 303. In block 303-305, the component loops selecting topics of the topic store and calculating the relevance for the web pages of the selected web site to the selected topic. In blocks 303, the component selects the next topic of the topic store. In decision block 304, if all the topics of the topic store have already been selected, then the component continues at block 306, else the component continues at block 305. In block 305, the component calculates the relevance of the web pages of the selected web site to the selected topic by invoking the calculate relevance component and then loops to block 303 to select the next topic. The calculate relevance component stores the relevance for each web page in the topic/page relevance store. In blocks 306-308, the component loops generating the features for the web pages of the selected web site. In block 306, the component selects the next feature, which may be stored in a feature store. In decision block 307, if all the features have already been selected, then the component loops to block 301 to select the next web site, else the component continues at block 308. In block 308, the component generates the selected feature for each page of the selected web site by invoking the generate feature component and then loops to block 306 to select the next feature. The generate feature component stores the features for each web page in the page feature store.

Figure 4:
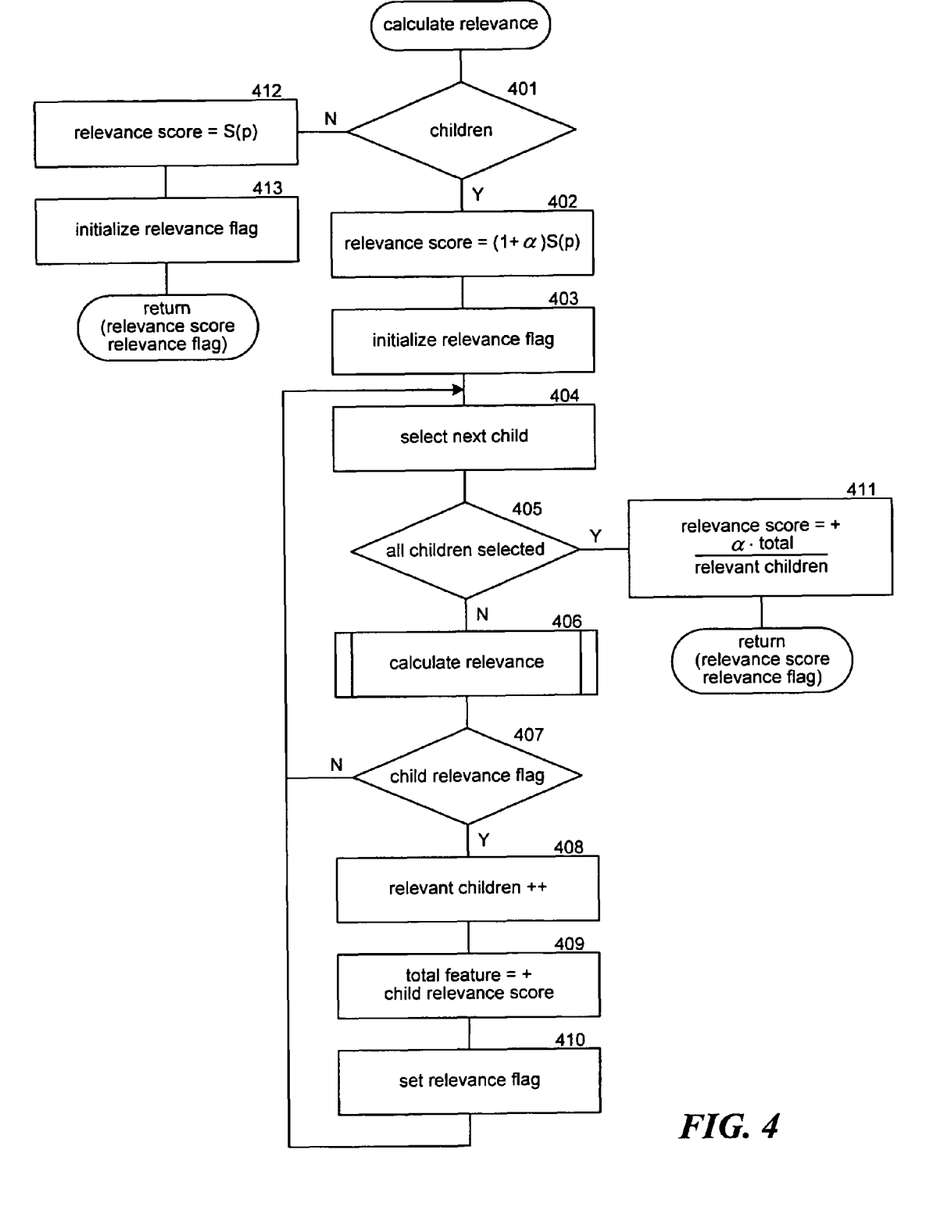
FIG. 4 is a flow diagram that illustrates the processing of the calculate relevance component of the contribution system in one embodiment.

FIG. 4 is a flow diagram that illustrates the processing of the calculate relevance component of the contribution system in one embodiment. The component is passed a topic and a web page and calculates the relevance of the passed web page and its descendant web pages to the topic. The component is described as a recursive component that calculates the relevance by a depth first traversal of the web site hierarchy that propagates the relevance from the leaf web pages to the passed web page. In decision block 401, if the passed web page has descendant web pages, then the component continues at block 402, else the component continues at block 412. In block 402, the component calculates the relevance score for the passed web page based on the content of the web page itself. Since the passed web page has descendant web pages, the component increases the relevance by α. In block 403, the component initializes a relevance flag to indicate whether the passed web page is relevant to the topic. In blocks 404-410, the component loops calculating the relevance of each child web page of the passed web page. In block 404, the component selects the next child web page of the passed web page. In decision block 405, if all the child web pages have already been selected, then the component continues at block 411, else the component continues at block 406. In block 406, the component recursively invokes the calculate relevance component passing the selected child web page to calculate its relevance. In decision block 407, if the selected child web page is relevant to the topic as indicated by the returned relevance flag, then the component continues at block 408, else the component loops to block 404 to select the next child web page. In block 408, the component increments the number of child web pages of the passed web page that are relevant to the topic. In block 409, the component accumulates the relevance score of the child web pages that are relevant to the topic. In block 410, the component sets the relevance flag for the passed web page to indicate that it is relevant. The passed web page is considered to be relevant to the topic if it is relevant to the topic or any of its child web pages are relevant to the topic. The component then loops to block 404 to select the next child web page. In block 411, the component sets the relevance score for the passed web site to the relevance score for the passed web page itself plus a relevance score derived from the relevant child web pages. The component then returns the relevance score and the relevance flag. In a block 412, the component calculates the relevance score for a passed web page that has no child web pages. In block 413, the component initializes the relevance flag to indicate whether the passed web page is relevant to the topic. The component then returns the relevance score and the relevance flag.

Figure 5:
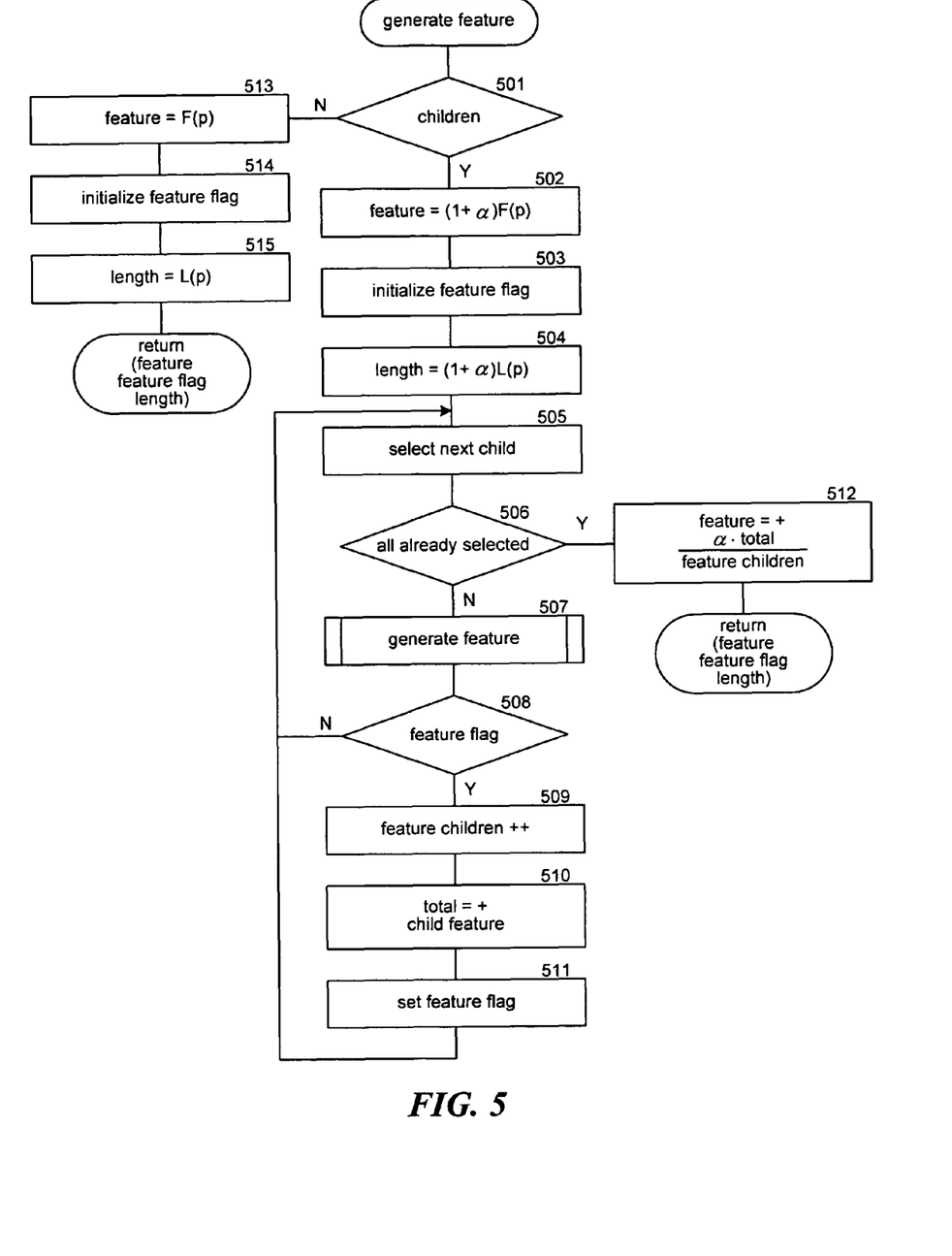
FIG. 5 is a flow diagram that illustrates the processing of the generate feature component of the contribution system in one embodiment.

FIG. 5 is a flow diagram that illustrates the processing of the generate feature component of the contribution system in one embodiment. The component is passed an indication of a feature and a web page and calculates the feature of the passed web page and its descendant web pages. The component is described as a recursive component that generates the feature for the passed web page and its ancestor web pages by a depth first traversal that propagates the feature from the leaf web pages to the passed web page. In decision block 501, if the passed web page has child web pages, then the component continues at block 502, else the component continues at block 513. In block 502, the component calculates the feature for the passed web page based on the web page itself. Since the passed web page has descendant web pages, the component increases the feature by α. In block 503, the component initializes a feature flag to indicate whether the passed web page is related to the feature. In block 504, the component sets the length of the passed web page. Since the passed web page has descendant web pages, the component increases the length by α. Alternatively, the contribution system may have a separate component for generating the length of a web page. In blocks 505-511, the component loops generating the feature for each child web page of the passed web page. In block 505, the component selects the next child web page of the passed web page. In decision block 506, if all the child web pages have already been selected, then the component continues at block 512, else the component continues at block 507. In block 507, the component recursively invokes the generate feature component passing the selected child web page to generate its feature. In decision block 508, if the selected child web page is related to the feature as indicated by the returned feature flag, then the component continues at block 509, else the component loops to block 505 to select the next child web page. In block 509, the component increments the number of child web pages of the passed web page that are related to the feature. In block 510, the component accumulates the feature of the child web pages that are related to the feature. In block 511, the component sets the feature flag for the passed web page to indicate that it is related. The passed web page is considered to be related to the feature if it or any of its child web pages are related to the feature. The component then loops to block 505 to select the next child web page. In block 512, the component sets the feature for the passed web page to the feature calculated based on the passed web page itself plus a feature derived from the child web pages that are related to the feature. The component then returns the feature, the length, and the feature flag. In block 513, the component calculates the feature for a passed web page that has no child web pages. In block 514, the component initializes the feature flag to indicate whether the passed web page is related to the feature. In block 515, the component calculates the length of the passed web page. The component then returns the feature, the length, and the feature flag.

Although the subject matter has been described in language specific to structural features and/or methodological acts, it is to be understood that the subject matter defined in the appended claims is not necessarily limited to the specific features or acts described above. Accordingly, the invention is not limited except as by the appended claims.

We claim:

1. A method in a computer system with a processor and storage device for using a hierarchy showing a web page and child web pages in a web site for generating a feature of the web page, the method comprising:

providing the hierarchy of the web pages of the web site, wherein a parent web page of the web site and a child web page of the web site have a parent and child relationship when the parent web page is identified by a parent uniform resource locator of a parent depth and the child web page is identified by a child uniform resource locator of a child depth such that the parent uniform resource locator is a prefix of the child uniform resource location and the child depth is one more than the parent depth irrespective of whether the parent web page has a link to a child web page or whether the child web page has a link to the parent web page;

for each of a plurality of topics, calculating relevance of the web page to the topic by:
  when the web page has no child web page as indicated by the hierarchy, setting the relevance using the web page; and
  when the web page has a child web page as indicated by the hierarchy, setting the relevance using the web page and the child web page; and for each of a plurality of features,
  when the web page has no child web pages as indicated by the hierarchy, setting the feature of the web page using the web page;
  when the web page has a child web page as indicated by the hierarchy, setting the feature of the web page using the web page and using the child web pages.

2. The method of claim 1 wherein the feature further comprises a length; wherein the length is represented by the following:

$$L'(p) = \begin{cases} L(p) & Child(p) = \Phi \\ (1+\alpha)*L(p) & Child(p) \neq \Phi \end{cases}$$

where L'(p) represents an adjusted length of web page p, L (p) represents a length of web page p, Child (p) represents the child web pages of p, $\Phi$ represents the empty set, and $\alpha$ represents a factor for increasing the length of web page p.

3. The method of claim 1 wherein the identified feature of the web page is based on a feature of the web page itself and a feature of child web pages.

4. A computer system for identifying a feature of web pages of a web site, comprising:
  a memory containing:
    an indication of a hierarchy of web pages of the web site, the hierarchy specifying child web pages of the web site wherein a parent web page of the web site and a child web page of the web site have a parent and child relationship when the parent web page is identified by a parent uniform resource locator of a parent depth and the child web page is identified by a child uniform resource locator of a child depth such that the parent uniform resource locator is a prefix of the child uniform resource location and the child depth is one more than the parent depth irrespective of whether the parent web page has a link to a child web page or whether the child web page has a link to the parent web page;
    a component with computer-executable instructions that, for each web page of the web site, identifies relevance of the web page to a topic such that when the web page has no child web pages, the relevance is based on the web page itself and when the web page has a child web page, the relevance is based on the web page and a child web page; and
    a component with computer-executable instructions that, for each web page of the web site, sets the feature of the web page such that when the web page has no child web pages as indicated by the hierarchy, the feature of the web page is based on the web page itself and when the web page has a child web page as indicated by the hierarchy, the feature of the web page is based the web page and a child web page; and
  a processor for executing the computer-executable instructions of the component.

5. The computer system of claim 4 wherein the providing of the hierarchy includes deriving the hierarchy from identifiers of the web pages.

6. The computer system of claim 5 wherein the identifiers of the web pages are uniform resource locators.

7. A computer-readable medium containing instructions for controlling a computer system to determine a feature contribution of a feature to documents within a hierarchy of documents, the documents being web pages, the hierarchy of documents being web pages of the same web site, by a method comprising:
  providing the hierarchy of the web pages, the hierarchy specifying child web pages of the web pages wherein a parent web page of the web site and a child web page of the web site have a parent and child relationship when the parent web page is identified by a parent uniform resource locator of a parent depth and the child web page is identified by a child uniform resource locator of a child depth such that the parent uniform resource locator is a prefix of the child uniform resource location and the child depth is one more than the parent depth irrespective of whether the parent web page has a link to a child web page or whether the child web page has a link to the parent web page; for each web page,
  identifying relevance of the web page to a topic such that when the web page has no child web pages, the relevance is based on the web page itself and when the web page has a child web page, the relevance is based on the web page and a child web page; and
  determining a feature contribution of the web page that factors in the feature contribution of child web pages by:
    when the web page has no child web pages as indicated by the hierarchy, setting the feature of the web page using the web page;
    when the web page has a child web page as indicated by the hierarchy, setting the feature of the web page using the web page and using a child web page.

8. The computer-readable medium of claim 7 wherein the feature is a length; wherein the length is represented by the following:

$$L'(p) = \begin{cases} L(p) & Child(p) = \Phi \\ (1+\alpha)*L(p) & Child(p) \neq \Phi \end{cases}$$

where L'(p) represents an adjusted length of web page p, L (p) represents a length of web page p, Child (p) represents the child web pages of p, $\Phi$ represents the empty set, and $\alpha$ represents a factor for increasing the length of web page p.

9. The method of claim 1 wherein the feature is selected from the group consisting of term frequency, keyword frequency, title, image size, and length.

10. The method of claim 1 including storing the feature of each web page in a page feature store.

* * * * *